(12) United States Patent
Landis et al.

(10) Patent No.: US 11,516,714 B2
(45) Date of Patent: Nov. 29, 2022

(54) MEASUREMENT OF NUMBER OF SPATIAL-DOMAIN STREAMS AVAILABLE FOR MULTIPLEXING

(71) Applicant: QUALCOMM Incorporated, San Diego, CA (US)

(72) Inventors: Shay Landis, Hod Hasharon (IL); Ran Berliner, Kfar-Aviv (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 17/145,227

(22) Filed: Jan. 8, 2021

(65) Prior Publication Data

US 2022/0225186 A1 Jul. 14, 2022

(51) Int. Cl.
*H04B 17/318* (2015.01)
*H04B 17/336* (2015.01)
*H04W 36/00* (2009.01)

(52) U.S. Cl.
CPC ...... *H04W 36/0077* (2013.01); *H04B 17/318* (2015.01); *H04B 17/336* (2015.01); *H04W 36/0058* (2018.08); *H04W 36/00837* (2018.08)

(58) Field of Classification Search
CPC ......... H04W 36/0077; H04W 36/0058; H04W 36/00837; H04W 72/0413; H04W 72/046; H04W 72/0426; H04W 72/0433; H04B 17/318; H04B 17/336; H04B 7/0408; H04B 7/0413; H04B 7/0452; H04B 7/0617; H04B 7/0639; H04B 7/0695; H04B 7/088; H04J 11/00; H04J 11/0023
See application file for complete search history.

(56) References Cited

U.S. PATENT DOCUMENTS 10,616,773 B2 4/2020 Huang
2003/0190897 A1\* 10/2003 Lei .................. H04B 7/0695
455/101

(Continued)

OTHER PUBLICATIONS

Onggosanusi et al., "Modular and High-Resolution Channel State Information and Beam Management for 5G New Radio," IEEE Communications Magazine, Mar. 2018, pp. 48-55 (Year: 2018).\*

(Continued)

*Primary Examiner* — Un C Cho
*Assistant Examiner* — Lalita W Pace
(74) *Attorney, Agent, or Firm* — Procopio, Cory, Hargreaves

(57) ABSTRACT

Aspects of the present disclosure include methods and devices for wireless communication including an apparatus, e.g., a UE. The apparatus may be configured to receive one or more reference signals from each transmit beam of a set of transmit beams of a first base station through each receive beam of a set of receive beams of the UE. The apparatus may be further configured to determine a set of transmit-beam receive-beam pairs based on the received reference signals. The apparatus may be further configured to determine a subset of the transmit-beam receive-beam pairs of the set of transmit-beam receive-beam pairs that are mutually non-interfering with each other. The apparatus may be further configured to transmit, to a second base station, a report indicating information associated with the subset of the transmit-beam receive-beam pairs.

30 Claims, 11 Drawing Sheets

(56) References Cited

U.S. PATENT DOCUMENTS

| | | | | |
|---|---|---|---|---|
| 2013/0155847 | A1* | 6/2013 | Li | H04W 24/04 |
| | | | | 370/225 |
| 2014/0112269 | A1* | 4/2014 | Yu | H04B 7/024 |
| | | | | 370/329 |
| 2016/0337916 | A1* | 11/2016 | Deenoo | H04W 36/0094 |
| 2017/0208494 | A1 | 7/2017 | Moon et al. | |
| 2017/0214444 | A1* | 7/2017 | Nigam | H04B 7/0634 |
| 2018/0103407 | A1 | 4/2018 | Nagaraja et al. | |
| 2019/0082331 | A1 | 3/2019 | Raghavan et al. | |
| 2019/0245606 | A1* | 8/2019 | Ha | H04B 7/0695 |
| 2019/0379464 | A1* | 12/2019 | Ng | H04B 17/11 |
| 2020/0112355 | A1* | 4/2020 | Park | H04B 7/0626 |
| 2020/0259547 | A1* | 8/2020 | Castaneda | H04B 7/088 |
| 2020/0260358 | A1* | 8/2020 | Ratnam | H04B 7/0695 |
| 2020/0267804 | A1* | 8/2020 | Kakishima | H04B 7/088 |
| 2021/0111779 | A1* | 4/2021 | Kundargi | H04B 7/0617 |
| 2021/0251040 | A1* | 8/2021 | Tang | H04W 24/10 |
| 2021/0399821 | A1* | 12/2021 | Chung | H04B 7/088 |
| 2022/0069884 | A1* | 3/2022 | Zhang | H04B 7/0408 |

OTHER PUBLICATIONS

Li et al., "Beam Management in Millimeter-Wave Communicaitons for 5G and Beyond," IEEE Access, vol. 8, 2020, pp. 13282-13293. (Year: 2020).*

International Search Report and Written Opinion—PCT/US2021/063157—ISA/EPO—dated Apr. 11, 2022.

* cited by examiner

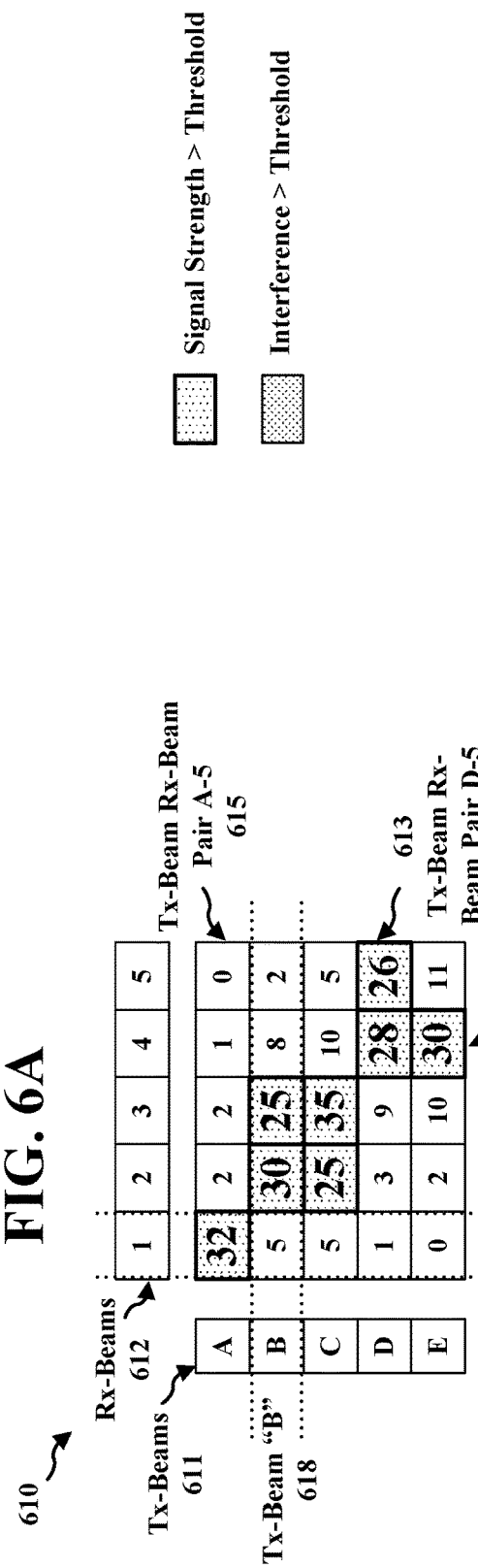
FIG. 6A
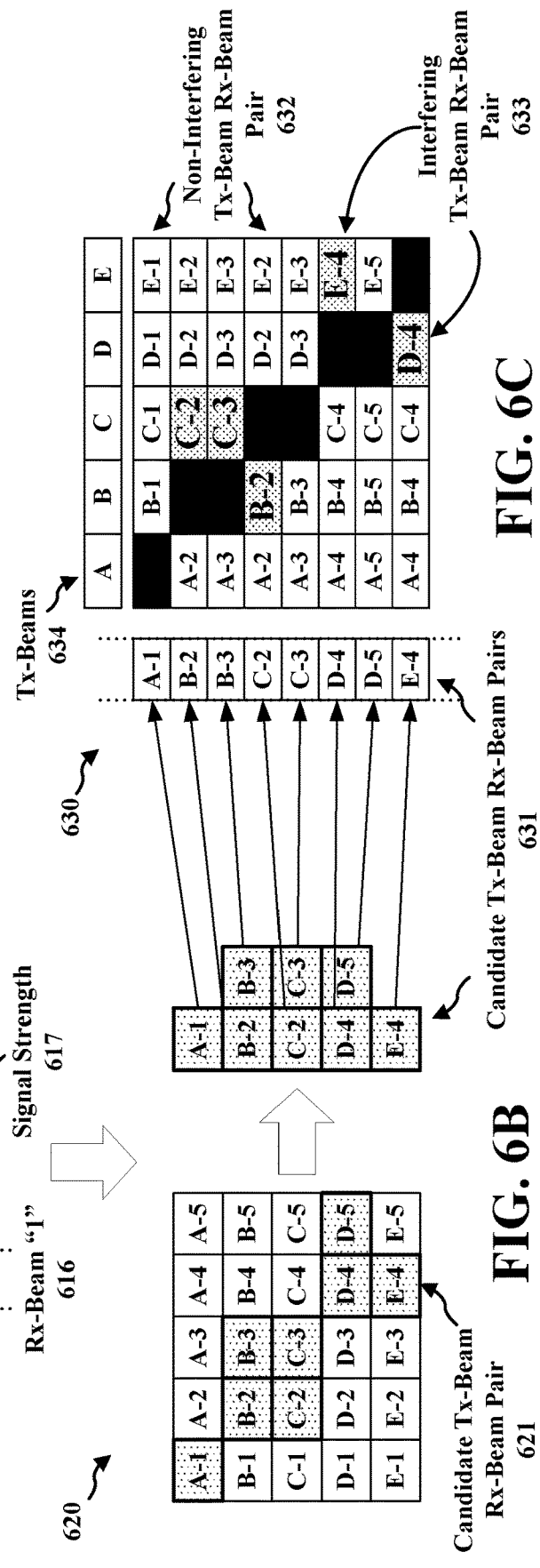
FIG. 6B
FIG. 6C

MEASUREMENT OF NUMBER OF SPATIAL-DOMAIN STREAMS AVAILABLE FOR MULTIPLEXING

BACKGROUND

Technical Field

The present disclosure relates generally to communication systems, and more particularly, to measurements of neighbor cell reference signals (e.g., synchronization signal block (SSB) or channel state information (CSI) reference signals (RS) (CSI-RS)) for mobility.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In 5G NR, both base stations (e.g., gNodeB (gNB)) and user equipments (UEs) may use directional antenna to transmit and/or receive directed beams. Additionally, as higher bands are used (e.g., frequency range (FR) 2, FR4, FR5, etc.) directed beams may become narrower to overcome higher propagation losses. For narrower beams with high directivity, multiple beams from a base station (e.g., a macrocell, microcell, etc.) may be separately received (e.g., received without mutual interference) at a user equipment (UE). Multiple mutually non-interfering (e.g., independent) directed beams from a single base station can be used to increase throughput for a particular UE or can be used as a set of possible streams through which to maintain connectivity with the base station. However, current neighbor cell (e.g., base station) reporting for mobility (e.g., handover) may not allow a connected UE to determine a number of mutually non-interfering directed beams associated with different base stations that are candidates for handover.

In an aspect of the disclosure, a method, a computer-readable medium, and an apparatus are provided. The apparatus may be a device at a user equipment (UE). The device may be a processor and/or modem at a UE or the UE itself. The device is configured to receive one or more reference signals from each transmit beam of a set of transmit beams of a first base station through each receive beam of a set of receive beams of the UE. The device is further configured to determine a set of transmit-beam receive-beam pairs based on the received reference signals. In some configurations, determining the set of transmit-beam receive-beam pairs is based on (1) determining (e.g., measuring) at least one of a reference signal received power (RSRP), a reference signal received quality (RSRQ), a signal to noise ratio (SNR), or a signal to interference plus noise ratio (SINR) of the one or more reference signals received from each transmit beam of the set of transmit beams through each receive beam of the set of receive beams and (2) determining (e.g., identifying) transit-beam receive-beam pairs for which the at least one determined (e.g., measured) RSRP, RSRQ, SNR, or SINR is above at least one corresponding threshold value for inclusion in the set of transmit-beam receive-beam pairs. For example, a UE may determine an RSRP (and/or RSRQ, SNR, or SINR) for a particular transit-beam receive-beam pair associated with a base station and determine that it is greater than a threshold for RSRP (or, for a measured RSRQ, SNR, or SINR, a threshold for an RSRQ, SNR, or SINR, respectively) and may determine that the transit-beam receive-beam pair should be included in the set of transit-beam receive-beam pairs based on the RSRP being greater than the threshold.

The device is further configured to determine a subset of the transmit-beam receive-beam pairs of the set of transmit-beam receive-beam pairs that are mutually non-interfering with each other. In some configurations, determining the subset of transit-beam receive-beam pairs includes, for each receive beam in a transmit-beam receive-beam pair, (1) determining at least one of an RSRP, an RSRQ, an SNR, or an SINR for reference signals received from the transmit beams of the other transmit-beam receive-beam pairs through the receive beam of the transmit-beam receive-beam pairs (2) determine for each set of reference signals received from a particular transit beam whether any of the determined RSRP, RSRQ, SNR, or SINR are less than a corresponding threshold value for the particular measured quality (RSRP, RSRQ, SNR, or SINR), and (3) determine (e.g., identify), for the transmit-beam receive-beam pair, a group of non-interfering transit beams.

The threshold may be fixed or configured for each receive beam based on the determined (e.g., measured) RSRP, RSRQ, SNR, or SINR of the transmit-beam receive-beam pair to which the receive beam belongs. For example, one configuration may use an RSRP threshold of −97 dBm used for a first receive beam may be based on an RSRP of −85 dBm measured for the transmit-beam receive-beam pair to which the receive beam belongs, while for a second receive beam in a second transmit-beam receive-beam pair an RSRP threshold may be −87 dBm based on an RSRP of −77 dBm measured for the second transmit-beam receive-beam pair to which the second receive beam belongs. In other configurations, a fixed dBm difference may be used to determine a threshold such that the threshold for a given receive beam is a fixed fraction (e.g., a 10-dB difference is equal to a ratio of 10:1 of the larger value divided by the smaller value) of the determined RSRP, RSRQ, SNR, or SINR.

Based on the groups of non-interfering transmit beams for each transmit-beam receive-beam pairs, the subset of mutually non-interfering transmit-beam receive-beam pairs is determined in some configurations. In some configurations, the subset of mutually non-interfering transmit-beam receive-beam pairs is determined to include the largest number of transmit-beam receive-beam pairs, while in other configurations the subset is determined to include the transmit-beam receive-beam pairs with the strongest signals (e.g., the highest determined RSRP, RSRQ, SNR, or SINR). Other configurations may determine the subset of mutually non-interfering transmit-beam receive-beam pairs to balance the number of transmit-beam receive-beam pairs and the power of the transmit-beam receive-beam pairs.

The device is further configured to transmit, to a second base station, a report indicating information associated with the subset of the transmit-beam receive-beam pairs. In some configurations, the report indicates a number of transmit-beam receive-beam pairs in the subset of transmit-beam receive-beam pairs and/or a set of strength values associated with the transmit-beam receive-beam pairs in the subset of transmit-beam receive-beam pairs. In some configurations, the device is configured to transmit reports for a neighboring first base station to a second base station (e.g., a currently connected base station) when the number of mutually non-interfering transmit-beam receive-beam pairs in the determined subset of transmit-beam receive-beam pairs in the set of transmit-beam receive-beam pairs is greater than a threshold (e.g., greater than 1, 2, N).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6A is a diagram that illustrates a set of example signal strength measurements for the full set of transmit-beam receive-beam pairs possible in the configuration illustrated in FIG. 5.

FIG. 6B is a diagram that illustrates the determination of the set of transmit-beam receive-beam pairs of FIGS. 5 and 6A that have a signal strength or quality greater than a first threshold.

FIG. 6C is a diagram that illustrates the determination of the transmit-beam receive-beam pairs of FIGS. 5, 6A, and 6B that are non-interfering with each of the transmit-beam receive-beam pairs determined to have a signal strength or quality greater than a first threshold as illustrated in FIGS. 6A and 6B.

DETAILED DESCRIPTION

Figure 1:
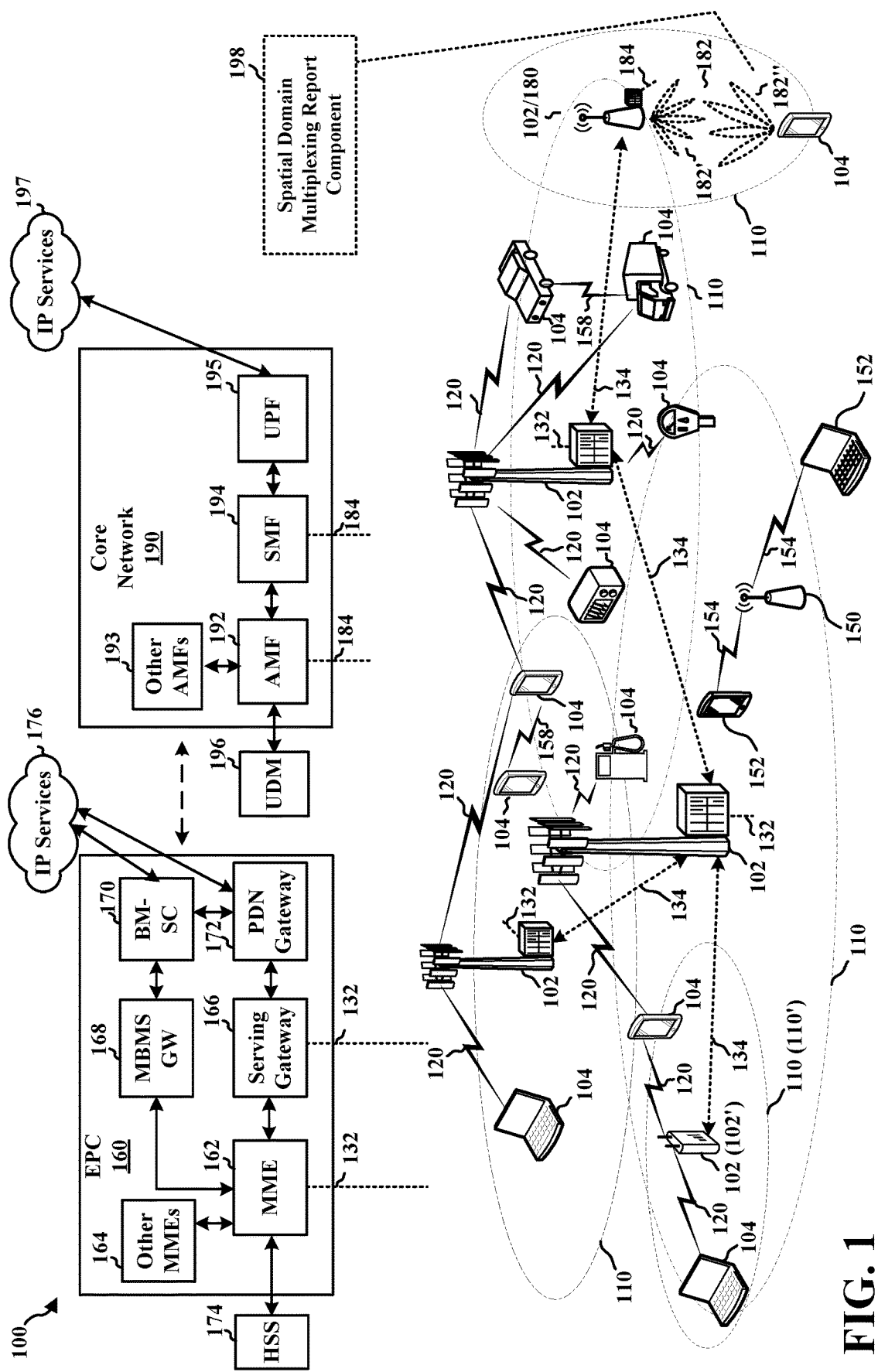
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP- GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6

GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a spatial domain multiplexing report component 198 that is configured to receive one or more reference signals from each transmit beam of a set of transmit beams of a first base station through each receive beam of a set of receive beams of the UE; determine a set of transmit-beam receive-beam pairs based on the received reference signals; determine a subset of the transmit-beam receive-beam pairs of the set of transmit-beam receive-beam pairs that are mutually non-interfering with each other; and transmit, to a second base station, a report indicating information associated with the subset of the transmit-beam receive-beam pairs. In certain aspects, the base station 180 may receive a report indicating a number of mutually non-interfering transmit-beam receive-beam pairs associated with a neighboring base station and make handoff/handover decisions based on the received report. Although the following description may be focused on reports relating to base station handover, the concepts described herein may be applicable to other similar areas, such reports relating to handover for vehicle-to-vehicle (V2V), vehicle-to-everything (V2X), or other device-to-device (D2D) communication.

Figure 2:
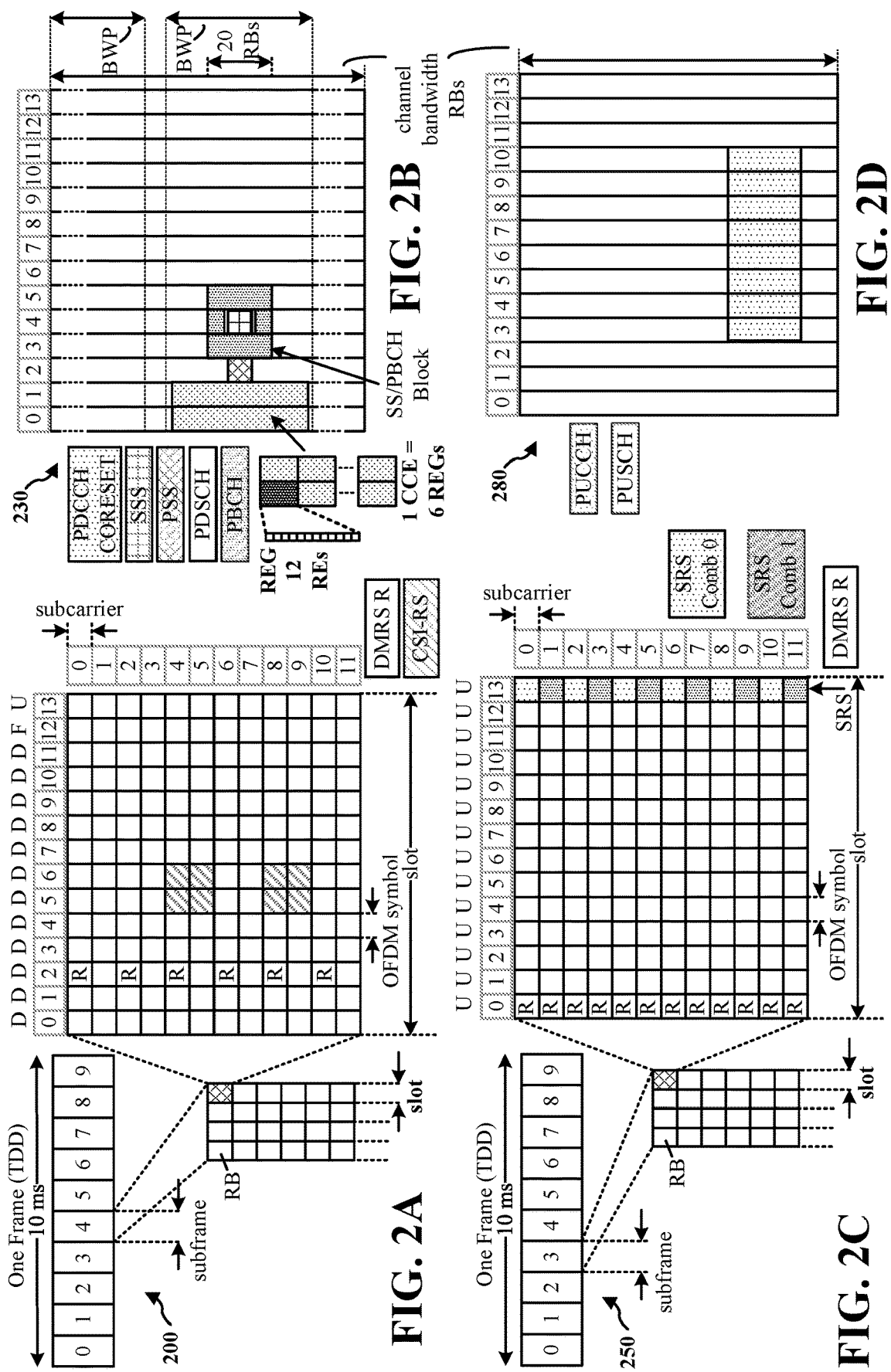
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
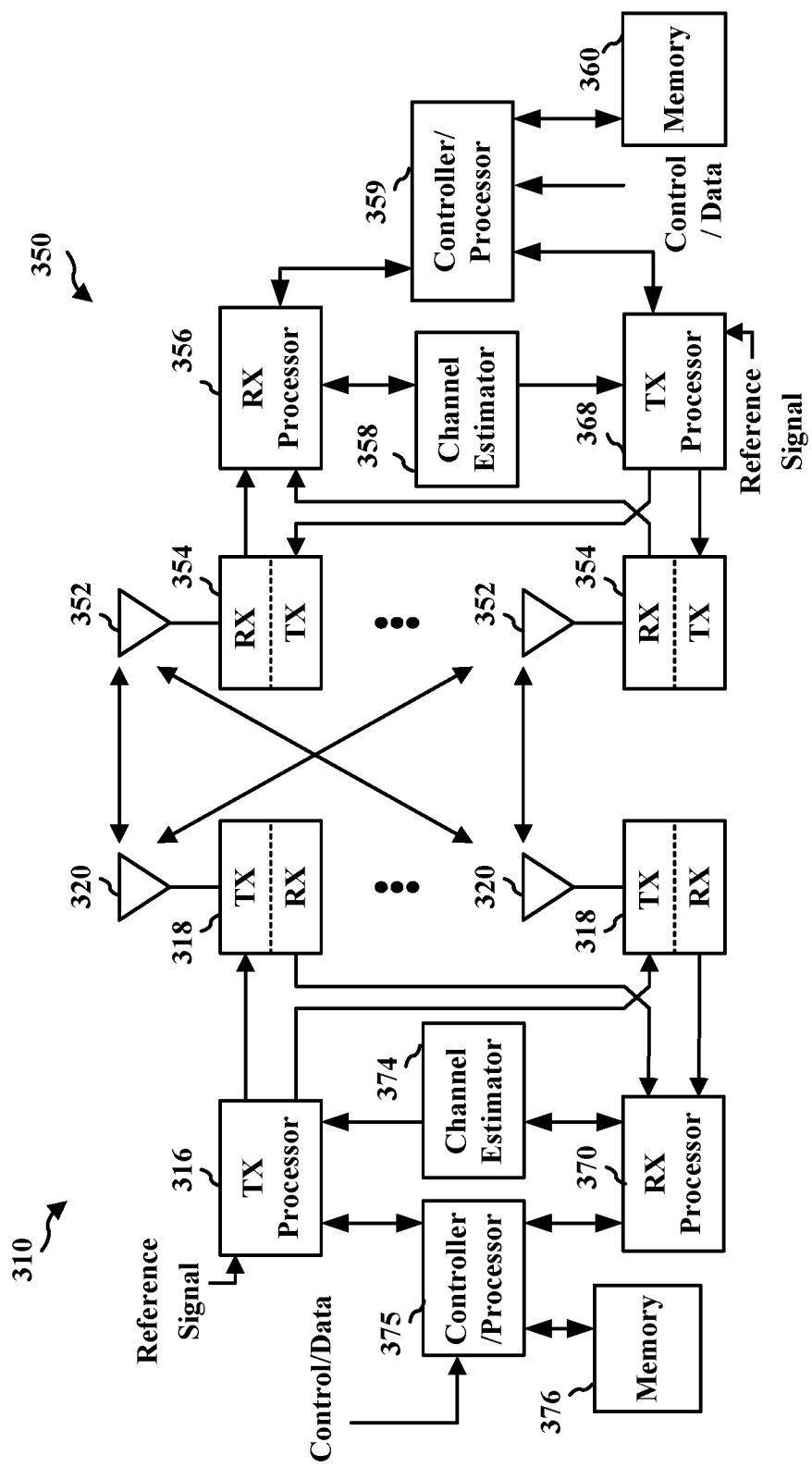
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

In aspects of wireless communications, e.g., 5G NR, both base stations (e.g., gNodeB (gNB)) and user equipments (UEs) may use directional antenna(e) to transmit and/or receive directed beams. Additionally, as higher bands are used (e.g., frequency range (FR) 2, FR4, FR5, etc.), directed beams may become narrower to overcome higher propagation losses. For narrower beams with high directivity, multiple beams from a base station (e.g., a macrocell, microcell, etc.) may be separately received (e.g., received without mutual interference) at a user equipment (UE). Multiple mutually non-interfering (e.g., independent) directed beams from a single base station can be used to increase throughput for a particular UE or can be used as a set of possible streams through which to maintain connectivity with the base station. However, current neighbor cell (e.g., base station) reporting for mobility (e.g., handoff or handover) may not allow a connected UE to determine a number of mutually non-interfering directed beams associated with different base stations that are candidates for handoff/handover.

Figure 4:
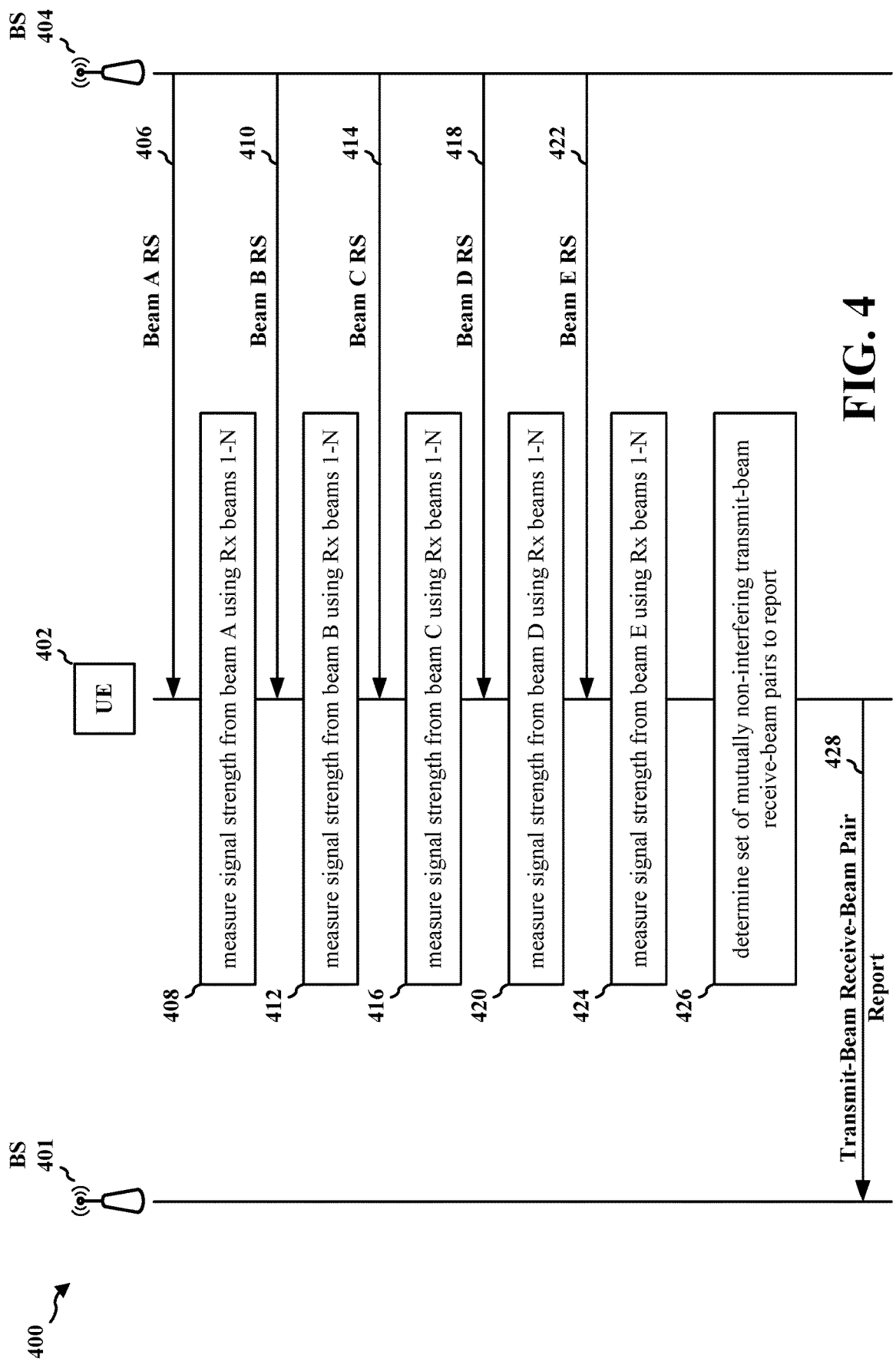
FIG. 4 is a call flow diagram illustrating a UE measuring reference signals received through a set of N receive beams for a set of 5 transmit beams from a first base station and transmitting a report regarding the first base station to a second base station.

FIG. 4 is a call flow diagram 400 illustrating a UE 402 measuring reference signals received through a set of N receive beams for a set of transmit beams, e.g., 5 transmit beams, from a base station (BS) 404 and transmitting a report regarding BS 404 to BS 401. BS 404 transmits reference signals 406 (e.g., SSB or CSI-RS) using a particular directional beam. UE 402 receives the reference signals and measures, at 408, the reference signals using each of a set of directional reception path (e.g., receive beams 1-N). The measurement may include one or more measurements of signal strength or quality such as RSRP, RSRQ, SNR, or SINR. Similarly, BS 404 transmits reference signals 410, 414, 418, and 422 using directional beams B, C, D, and E, respectively. UE 402 receives the reference signals for each transmit beam through each of the receive beams 1-N and measures the one or more measures of signal strength or quality, at 412, 416, 420, and 424, of the reference signals using each receive beam 1-N. The order of the beam reception may be different in different configurations. For example, each receive beam may receive and measure each transmit beam before a UE changes a receive beam (e.g., from receive beam 1 to receive beam 2) used to receive transmitted reference signals.

UE 402 determines, at 426, a set of non-interfering transmit-beam receive-beam pairs for reporting to BS 401. The determining, in some configurations, may include comparing the one or more measurements associated with the received reference signals (e.g., an RSRP, RSRQ, SNR, or SINR) to one or more corresponding thresholds to determine whether to include one or more pairings of transmit beams A-E and a receive beam 1-N in a set of transmit-beam receive-beam pairs that are of sufficient strength or quality to facilitate a connection with BS 404 for handoff/handover. The comparison may be performed as part of the measurement operation or as a separate determination operation after all the measurements have been made. Additionally, in some configurations, the determining may include determining a subset of the determined set of transmit-beam receive-beam pairs that are mutually non-interfering with each other, as will be discussed below in more detail in regards to FIGS. 5-7 and 10.

After determining the set of mutually non-interfering transmit-beam receive-beam pairs to report to BS 401, the UE 402 transmits a report regarding the mutually non-interfering transmit-beam receive-beam pairs 428. In some configurations, the report may indicate a number of transmit-beam receive-beam pairs in the subset of transmit-beam receive-beam pairs and/or a set of strength values associated with the transmit-beam receive-beam pairs in the subset of transmit-beam receive-beam pairs.

Figure 5:
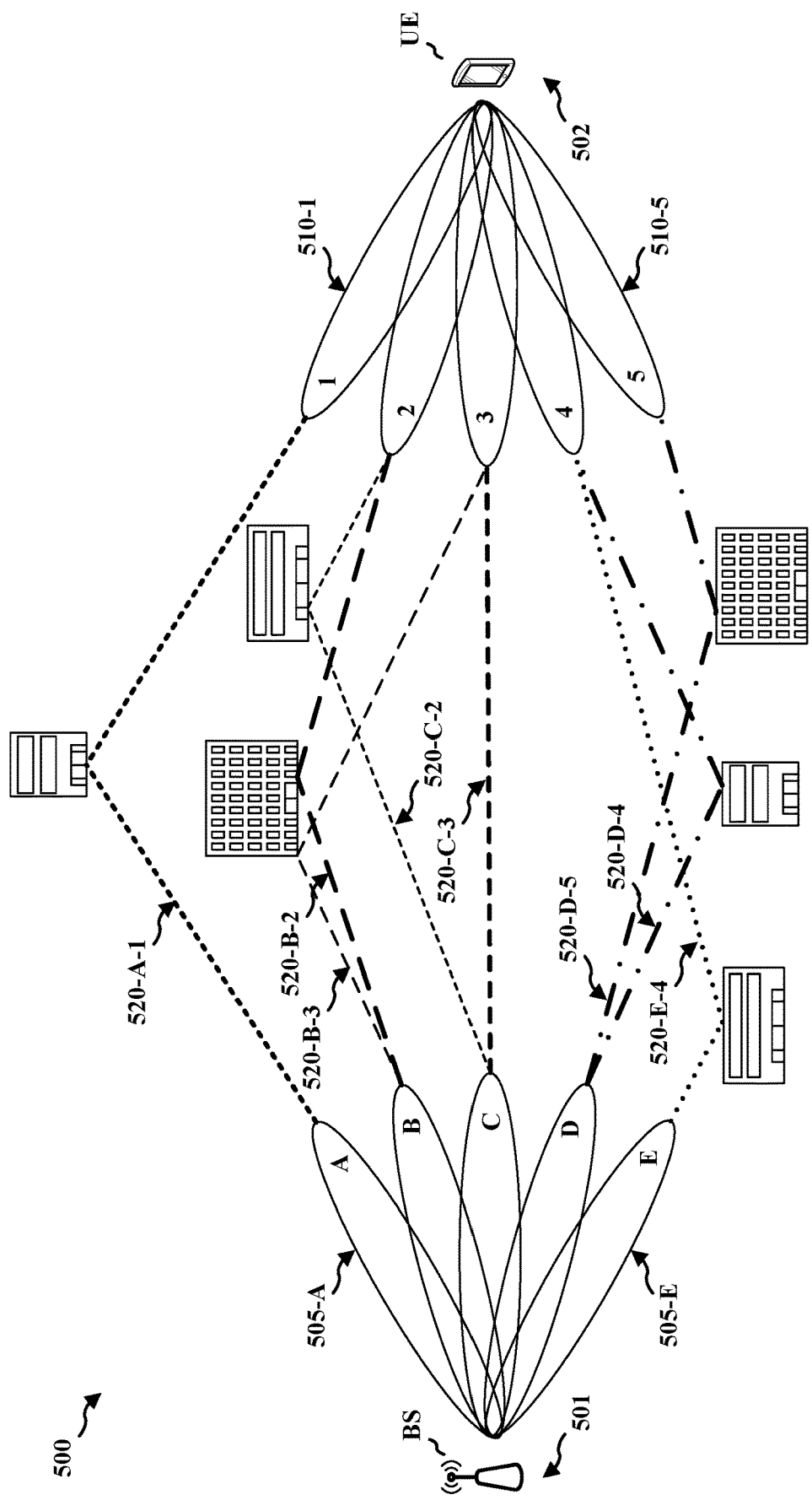
FIG. 5 is a diagram that illustrates a set of transmit beams of a base station and receive beams of a UE.

FIG. 5 is a diagram 500 that illustrates a set of transmit beams (e.g., beamformed transmission paths) 505-A to 505-E of a BS 501 and receive beams (e.g., directional reception antennas) 510-1 to 510-5 of a UE 502. FIG. 5 further illustrates paths for transmit-beam receive-beam pairs 520-X-#, where "X" identifies a transmit-beam (e.g., transmit beam A-E)) and "#" identifies a receive-beam (e.g., receive beam 1-5). For example, path 520-C-3 identifies a path traversed by a reference signal transmitted through transmit-beam C and received through receive-beam 3. The transmit-beam receive-beam pairs for which a path 520-X-# is illustrated represent transmit-beam receive-beam pairs with a signal strength or quality greater than a threshold, as discussed above in relation to identifying the set of transmit-beam receive-beam pairs in FIG. 4 and as will be discussed below in relation to FIGS. 5-7 and 10.

FIG. 6A is a diagram 610 that illustrates a set of example signal strength measurements for the full set of transmit-beam receive-beam pairs possible in the configuration illustrated in FIG. 5. FIG. 6B is a diagram 620 that illustrates the determination (e.g., identification) of the set of transmit-beam receive-beam pairs of FIGS. 5 and 6A that have a signal strength or quality greater than a first threshold. FIG. 6C is a diagram 630 that illustrates the determination (e.g., identification) of the transmit-beam receive-beam pairs of FIGS. 5, 6A, and 6B that are non-interfering with each of the transmit-beam receive-beam pairs determined to have a signal strength or quality greater than a first threshold, as illustrated in FIGS. 6A and 6B.

FIG. 6A assumes that a base station has five different directional transmit beams and a UE has five different receive beams, as depicted in FIG. 5. Accordingly, FIG. 6A illustrates a matrix of values associated with a particular measurement (e.g., RSRP, RSRQ, SNR, or SINR) of reference signals from each transmit beam (e.g., 505-A to 505-E) of a base station (e.g., BS 501) received at each receive beam (e.g., 510-1 to 510-5) of a UE (e.g., UE 502). The matrix may identify transmit-beam receive-beam pairs by the intersection of a column of transmit beam identifiers 611 (identifying rows of Tx-beam Rx-beam pairs such as the row 618 defined for Tx beam "B") and a row of receive beam identifiers 612 (identifying columns of Tx-beam Rx-beam pairs such as the column 616 defined for Rx beam "1"). In the measurement matrix illustrated in 610, each square in the matrix may represent a signal strength 617 (or other measured characteristic) of a particular transmit-beam receive-beam pair (e.g., Tx-beam Rx-beam pairs A-5 (615) and D-5 (613)).

The shaded elements in the measurement matrix represent transmit-beam receive-beam pairs for which the measured characteristic (e.g., measured as RSRP, RSRQ, SNR, or SINR) are greater than a first threshold. The threshold in the measurement matrix illustrated in 610 may be any value between 12 and 24. FIG. 6B illustrates a correspondence of the measurement matrix in FIG. 6A to a matrix of transmit-beam receive-beam pair identifiers. A shaded element of the matrix of transmit-beam receive-beam pair identifiers may be identified as a candidate transmit-beam receive-beam pair 621 for a determination of mutual non-interference with other candidate transmit-beam receive-beam pairs 621.

FIG. 6C illustrates that the candidate transmit-beam receive-beam pairs 621 identified in FIG. 6B are included in a set of candidate transmit-beam receive-beam pairs 631. For each candidate transmit-beam receive-beam pair 621 in the set of candidate transmit-beam receive-beam pairs 631, a determination may be made as to whether other transmit beams 634 of other candidate transmit-beam receive-beam pairs 621 are non-interfering. As illustrated in diagram 630, each transmit beam 634 is included in at least one candidate transmit-beam receive-beam pair 621. Accordingly, a determination of non-interference may be performed for each transmit beam at each receive beam in a candidate transmit-beam receive-beam pair 621. The determination for a particular candidate transmit-beam receive-beam pair 621 may be based upon a comparison of the particular measurement (e.g., RSRP, RSRQ, SNR, or SINR) of reference signals from each transmit beam of the base station received at the receive beam of the particular candidate transmit-beam receive-beam pair 621. For example, in diagram 630, if the measurement is a RSRP measured in dBm, a threshold may be based on a fixed difference (e.g., a 10 dBm difference) from the measured RSRP, or may be based on a difference between RSRPs that is dependent on RSRP measured for the particular candidate transmit-beam receive-beam pair 621 (e.g., a lower RSRP may result in a larger threshold difference, while a higher RSRP may result in a smaller threshold difference).

FIG. 6C illustrates that, for a particular candidate transmit-beam receive-beam pair 621, some transmit-beam receive-beam pairs 632 (e.g., transmit-beam receive-beam pairs that share a receive beam with the particular candidate transmit-beam receive-beam pair 621) may be non-interfering with the particular candidate transmit-beam receive-beam pair 621 (e.g., have a measured value that is less than a threshold associated with the particular candidate transmit-beam receive-beam pair 621). FIG. 6C also illustrates that, for a particular candidate transmit-beam receive-beam pair 621, other transmit-beam receive-beam pairs 633 (e.g., transmit-beam receive-beam pairs that share a receive beam with the particular candidate transmit-beam receive-beam pair 621) may be interfering with the particular candidate transmit-beam receive-beam pair 621 (e.g., have a measured value that is greater than a threshold associated with the particular candidate transmit-beam receive-beam pair 621). As illustrated in diagram 630, some candidate transmit-beam receive-beam pairs 621 (e.g., A-1, C-3, and D-5) may not experience interference from any other transmit beam 634. Other candidate transmit-beam receive-beam pairs 621 such as B-2, B-3, C-2, D-4, and E-4 may experience interference from at least one other transmit beam 634, for example, C, C, B, E, and D, respectively.

Figures 7A, 7B:
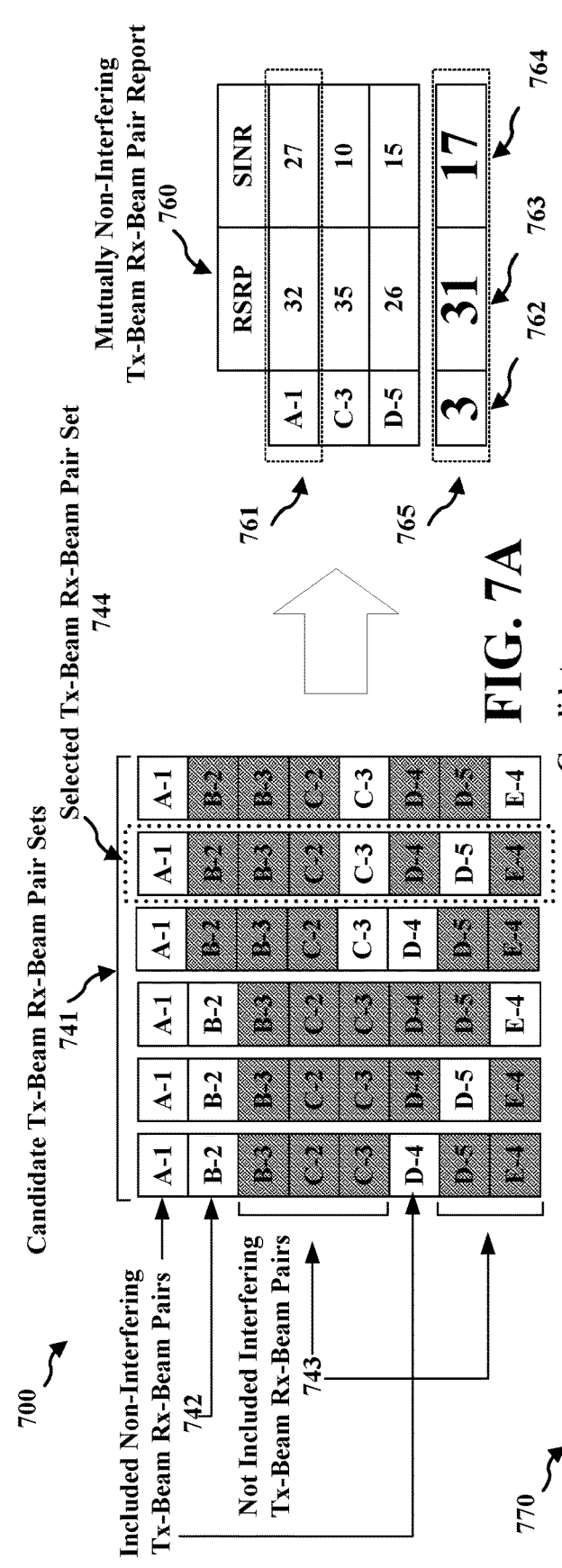
FIG. 7A is a diagram that illustrates determining a subset of the set of transmit-beam receive-beam pairs.
FIG. 7B is a diagram illustrating determining a subset of a set of transmit-beam receive-beam pairs.

FIG. 7A is a diagram 700 that illustrates determining a subset of the set of candidate transmit-beam receive-beam pairs 631. FIG. 7B is a diagram 770 illustrating determining a subset of a set of transmit-beam receive-beam pairs 781. FIG. 7A illustrates candidate transmit-beam receive-beam pair sets 741 that may include mutually non-interfering transmit-beam receive-beam pairs 742. For example, the candidate transmit-beam receive-beam pairs 621 included in a candidate transmit-beam receive-beam pair set in the candidate transmit-beam receive-beam pair sets 741 do not interfere with each other. FIG. 7A further illustrates that a candidate transmit-beam receive-beam pair set in the candidate transmit-beam receive-beam pair sets 741 may not include interfering transmit-beam receive-beam pairs 743. For example, diagram 630 in FIG. 6C illustrates that for a candidate transmit-beam receive-beam pair set in the candidate transmit-beam receive-beam pair sets 741 that includes a transmit-beam receive-beam pair that, in turn, includes transmit beam "B," a transmit-beam receive-beam pair that include the transmit beam "C" interferes and may not be included in the candidate transmit-beam receive-beam pair set.

A particular candidate transmit-beam receive-beam pair set 744 in the candidate transmit-beam receive-beam pair sets 741 may be selected as the basis for a mutually non-interfering transmit-beam receive-beam pair report 760. The particular candidate transmit-beam receive-beam pair set 744 may be selected based on any of multiple sets of criteria. For example, any of a set of mutually non-interfering transmit-beam receive-beam pairs that have the greatest average measurement (e.g., RSRP, RSRQ, SNR, or SINR), a set of mutually non-interfering transmit-beam receive-beam pairs that includes the largest number of mutually non-interfering transmit-beam receive-beam pairs, or a set of mutually non-interfering transmit-beam receive-beam pairs that do not experience interference from other transmit beams that are not included in the set of mutually non-interfering transmit-beam receive-beam pairs.

The mutually non-interfering transmit-beam receive-beam pair report 760 may indicate information associated with the selected transmit-beam receive-beam pair set 744 (e.g., a subset of the transmit-beam receive-beam pairs) and may include a number of transmit-beam receive-beam pairs in the selected candidate transmit-beam receive-beam pair set 744 and/or a set of one or more measured values associated with each of the transmit-beam receive-beam pairs in the selected candidate transmit-beam receive-beam pair set 744. For example, mutually non-interfering transmit-beam receive-beam pair report 760 may include a set of reported data 761 for each transmit-beam receive-beam pair that may include an identity of the transmit-beam receive-beam pair and one or more measured values (e.g., RSRP, RSRQ, SNR, or SINR) associated with the transmit-beam receive-beam pair. Alternatively, or additionally, the mutually non-interfering transmit-beam receive-beam pair report 760 may include an aggregated report 765 including a total number of mutually non-interfering transmit-beam receive-beam pair 762, an average (or otherwise summarized or aggregated) value for a first measured value (e.g., RSRP) 763, and an average (or otherwise summarized or aggregated) value for additional measured values (e.g., SINR) 764. The mutually non-interfering transmit-beam receive-beam pair report 760 may then be sent to a base station to be used in making handoff/handover determinations and/or decisions.

While FIGS. 6A-7A illustrate determining a subset of the transmit-beam receive-beam pairs of the set of transmit-beam receive-beam pairs that are mutually non-interfering with each other based on a signal strength 617, FIG. 7B illustrates a similar process for determining a subset of the transmit-beam receive-beam pairs of the set of transmit-beam receive-beam pairs that are mutually non-interfering with each other based on a relative signal strength 777. FIG. 7B is a diagram 770 that illustrates a matrix of relative values associated with a particular measurement (e.g., RSRP, RSRQ, SNR, or SINR) of reference signals from each transmit beam (e.g., 505-A to 505-E) of a base station (e.g., BS 501) received at each receive beam (e.g., 510-1 to 510-5) of a UE (e.g., UE 502). The values are based on diagram 610 in FIG. 6A. The matrix in diagram 770 identifies transmit-beam receive-beam pairs by the intersection of a column of transmit beam identifiers 771 (identifying rows of Tx-beam Rx-beam pairs such as the row 778 defined for Tx beam "B") and a row of receive beam identifiers 772 (identifying columns of Tx-beam Rx-beam pairs such as the column 776 defined for Rx beam "1").

In the measurement matrix illustrated in 770, each square in the matrix may represent a relative signal strength 777 of a particular transmit-beam receive-beam pair (e.g., Tx-beam Rx-beam pairs A-5 (775) and D-5 (773)). For example, if RSRP is measured, a relative signal strength may be calculated by comparing the RSRP for a first transmit-beam receive-beam pair to the largest RSRP for the transmit-beam receive-beam pair including the same receive beam as the first transmit-beam receive-beam pair but excluding the first transmit-beam receive-beam pair. Alternatively, if SINR is measured, the measured value for each transmit-beam receive-beam pair may already represent a relative signal strength of the reference signals received through a receive beam in the transmit-beam receive-beam pair compared to the reference signals received through the same receive beam from the other transmit-beam receive-beam pairs including the receive beam (e.g., received from the other transmit beams).

Based on the relative signal strengths 777 a candidate transmit-beam receive-beam pair set 781 may be identified by selecting transmit-beam receive-beam pairs that have a relative signal strength 777 greater than a threshold. Selecting transmit-beam receive-beam pairs that have a relative signal strength 777 greater than a threshold may ensure that the identified transmit-beam receive-beam pairs are mutually non-interfering with other transmit-beam receive-beam pairs in the candidate transmit-beam receive-beam pair set 781 and also that the transmit-beam receive-beam pairs in the candidate transmit-beam receive-beam pair set 781 do not experience interference from other transmit beams not included in a transmit-beam receive-beam pair in the candidate transmit-beam receive-beam pair set 781. The shaded elements in the measurement matrix represent transmit-beam receive-beam pairs for which the measured relative characteristic (e.g., based on RSRP, RSRQ, SNR, or SINR) are greater than a threshold. The threshold in the measurement matrix illustrated in 770 may be any appropriate value, e.g., a value between 6 and 9.

A mutually non-interfering transmit-beam receive-beam pair report 790 may indicate information associated with the candidate transmit-beam receive-beam pair set 781 (e.g., a subset of the transmit-beam receive-beam pairs) and may include a number of transmit-beam receive-beam pairs in the candidate transmit-beam receive-beam pair set 781 and/or a set of one or more measured values associated with each of the transmit-beam receive-beam pairs in the candidate transmit-beam receive-beam pair set 781. For example, mutually non-interfering transmit-beam receive-beam pair report 790 may include a set of reported data 791 for each transmit-beam receive-beam pair that may include an identity of the transmit-beam receive-beam pair and one or more measured values (e.g., RSRP, RSRQ, SNR, or SINR) associated with the transmit-beam receive-beam pair. Alternatively, or additionally, the mutually non-interfering transmit-beam receive-beam pair report 790 may include an aggregated report 795 including a total number of mutually non-interfering transmit-beam receive-beam pairs 792, an average (or otherwise summarized or aggregated) value for a first measured value (e.g., RSRP) 793, and an average (or otherwise summarized or aggregated) value for additional measured values (e.g., SINR) 794. The mutually non-interfering transmit-beam receive-beam pair report 790 may then be transmitted to a base station to be used in making handoff/handover determinations and/or decisions at the base station.

Figure 8:
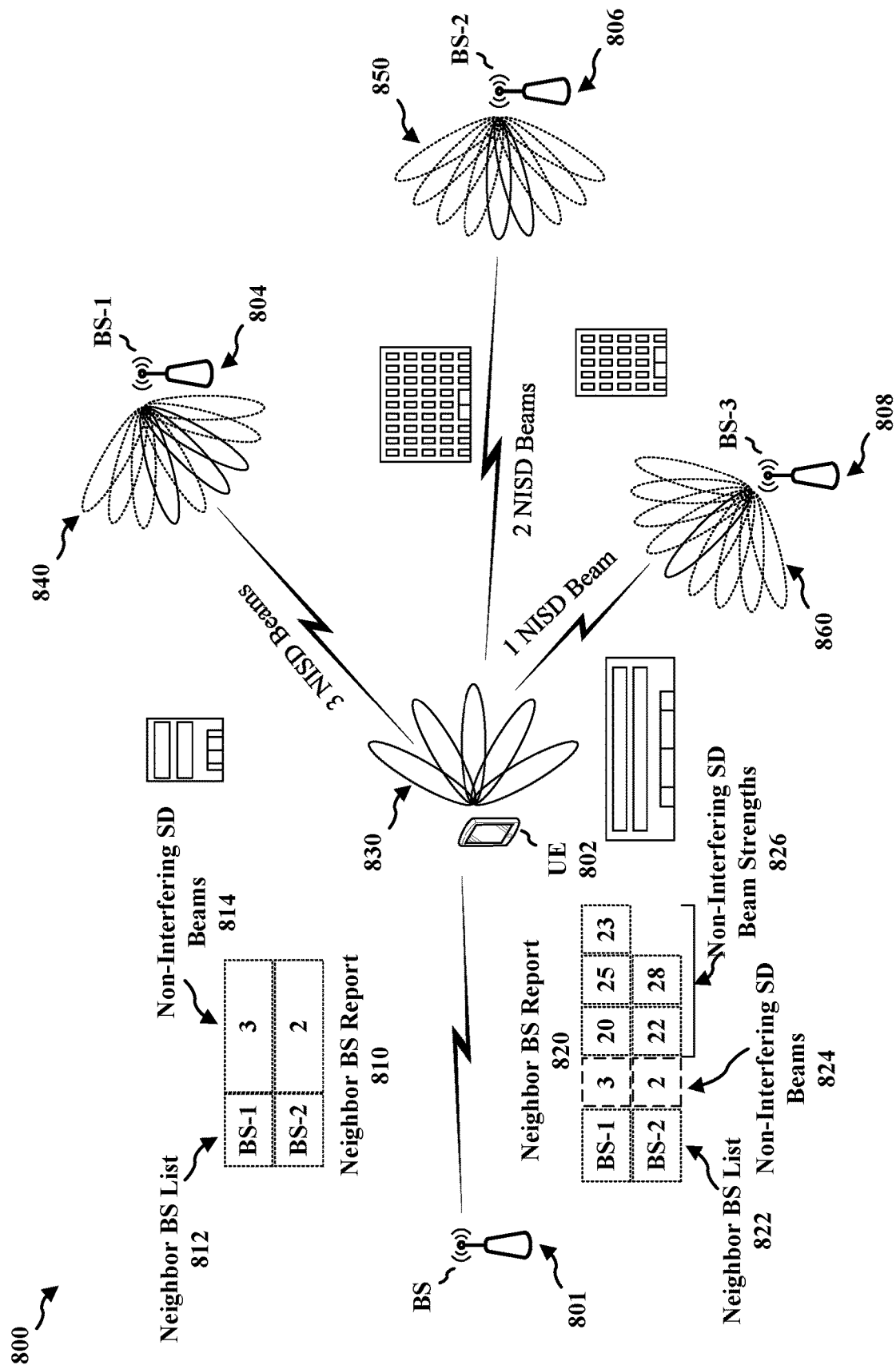
FIG. 8 is a diagram illustrating an example of a wireless communication system.

FIG. 8 is a diagram illustrating an example of a wireless communication system 800. Wireless communication system 800 includes a UE 802 currently connecting to the wireless communication system 800 through BS 801 and in communication with neighboring base stations 804-808. The UE 802 may have a plurality of directional receive beams 830 (similar to receive beams 510-1 through 510-5 in FIG. 5). Base stations 804-808 may have a plurality of transmit beams 840-860 respectively. The UE 802 may determine a set of non-interfering spatial domain (NISD) beams (e.g., mutually non-interfering transmit-beam receive-beam pairs) and a set of measurements for the set of NISD beams for each base station 804-808 as described in relation to FIGS. 5-7B, 9, and 10.

UE 802 may transmit a report (e.g., neighbor BS report 810 and/or 820) on mutually non-interfering transmit-beam receive-beam pairs for neighboring base stations 804-808 to BS 801. In some configurations, reports may be transmitted to BS 801 for base stations (e.g., BSs 804 and 806) with a threshold number of NISD beams and may not be transmitted to BS 801 for abase station (e.g., BS 808) that does not have a threshold number of NISD beams. Neighbor BS report 810 may include a list of neighbor BSs 812 and an associated number of NISD beams 814. In some configurations, separate neighbor BS reports 810 may be transmitted for different base stations. Neighbor BS report 820 may include a list of neighbor BSs 822, an associated number of NISD beams 824, and a set of measurements (e.g., strengths) 826 associated with the NISD beams. In some configurations, separate neighbor BS reports 820 may be transmitted for different base stations.

Figure 9:
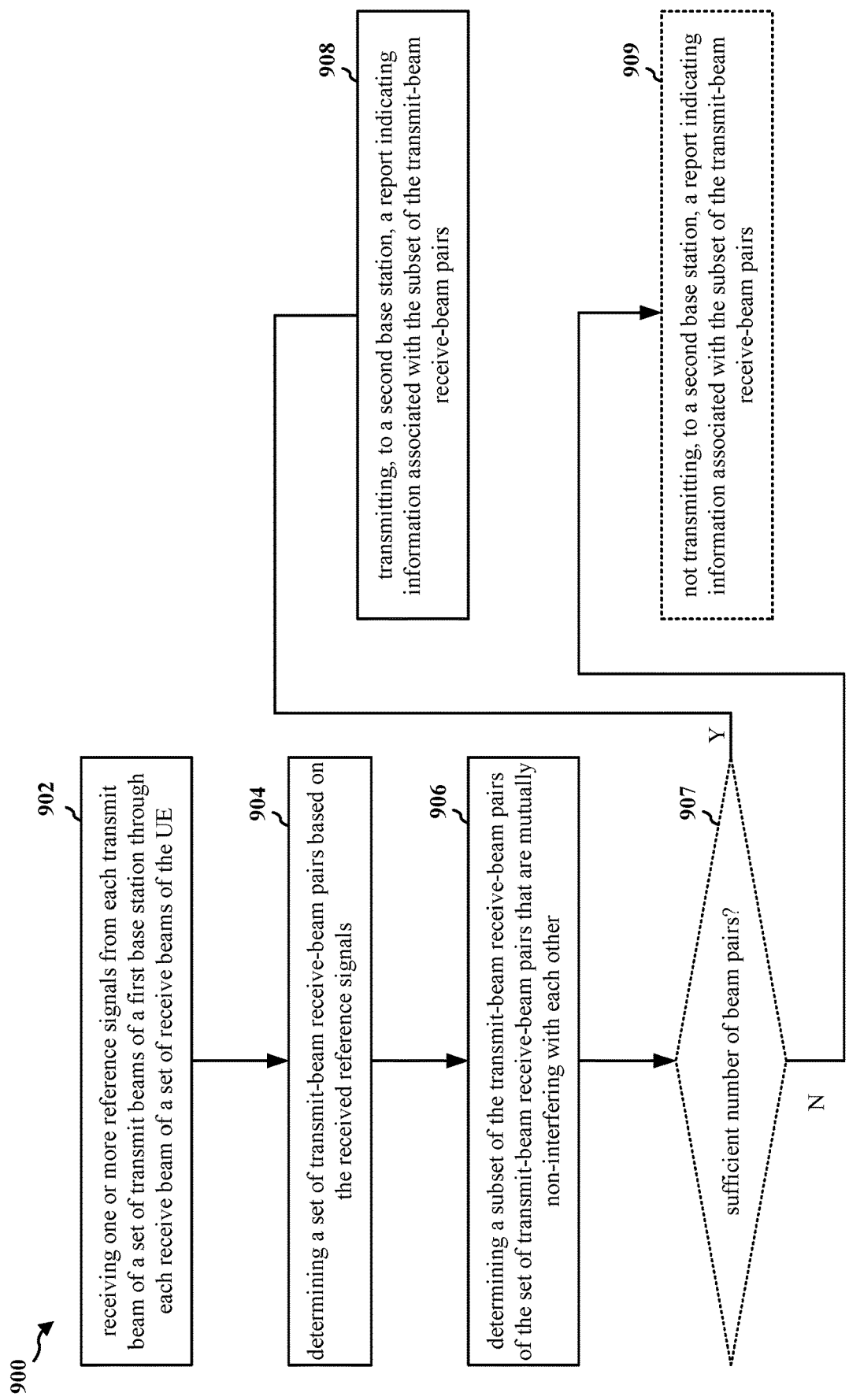
FIG. 9 is a flowchart of a method of wireless communication.

FIG. 9 is a flowchart 900 of a method of wireless communication. The method may be performed by a device at a UE (e.g., UE 104 of FIG. 1; UE 402, 502, 802, and 1102 of FIGS. 4, 5, 8, and 11, respectively). The device may be a processor/modem within the UE or the UE itself. The device is herein referred to as a UE. Optional aspects are illustrated with a dashed line. The UE may receive, at 902, one or more reference signals from multiple transmit beams of a set of transmit beams of a first base station through each receive beam of a set of receive beams of the UE, as described above in relation to FIGS. 5-8. For example, UEs 502 and 802 may receive reference signals from transmit beams 505-A through 505-E of FIG. 5 or any of transmit beams 840-860 of FIG. 8, respectively, through receive beams 510-1 through 510-5 of FIG. 5 and receive beams 830 of FIG. 8, respectively. Spatial domain multiplexing report component 1140 in FIG. 11 may perform 902. The received reference signals may be synchronization signal block (SSB) or channel state information (CSI) reference signals (RS) (CSI-RS).

The UE may then determine, at 904, a set of transmit-beam receive-beam pairs based on the received reference signals. The determined set of transmit-beam receive-beam pairs may be based on a measured characteristic (e.g., RSRP, RSRQ, SNR, or SINR) being above a first threshold as described above in connection with FIGS. 6A-7B above. The determined set of transmit-beam receive-beam pairs, may be the set of candidate transmit-beam receive-beam pairs 631 of FIGS. 6B and 6C. The determined set of transmit-beam receive-beam pairs may be determined as described in relation to FIGS. 6A-7B. Spatial domain multiplexing report component 1140 in FIG. 11 may perform 904.

The UE may then determine, at 906, a subset of the transmit-beam receive-beam pairs of the set of transmit-beam receive-beam pairs that are mutually non-interfering with each other. Spatial domain multiplexing report component 1140 in FIG. 11 may perform 906. The determined subset of the transmit-beam receive-beam pairs of the set of transmit-beam receive-beam pairs that are mutually non-interfering with each other may be one of multiple possible sets as described in relation to FIGS. 6A-7A or may be a single possible set as described in relation to FIG. 7B. Additionally, the determined subset may also be mutually non-interfering with all other of the transmit-beam receive-beam pairs as described in relation to FIGS. 6A-7A. The determination may be made based on a second threshold value associated with at least one measurement (e.g., RSRP, RSRQ, SNR, or SINR) of the reference signals received at 902 being above or below a second threshold value. As discussed above in connection with FIGS. 6C and 7B, the threshold may be a fixed value, or may depend on a measured value for reference signals of a particular transmit-beam receive-beam pair for which a determination of mutual non-interference is being made.

After determining, at 906, the subset of the transmit-beam receive-beam pairs of the set of transmit-beam receive-beam pairs that are mutually non-interfering with each other, the UE may determine, at 907, whether the number of mutually non-interfering transmit-beam receive-beam pairs in the subset is greater than, or equal to, a threshold (e.g., 2, 3, or N) for which reports may be generated and transmitted. Spatial domain multiplexing report component 1140 in FIG. 11 may perform 907. If the number of mutually non-interfering transmit-beam receive-beam pairs in the subset is less than the threshold, the particular iteration of the process for the particular base station ends at 909 by not transmitting a report indicating information associated with the subset of the transmit-beam receive-beam pairs to a second base station. The process illustrated in FIG. 9 may be performed periodically for each of a plurality of base stations from which the UE receives reference signals.

If the number of mutually non-interfering transmit-beam receive-beam pairs in the subset is greater than, or equal to, the threshold, the UE, at 908 may transmit, to a second base station, a report indicating information associated with the subset of the transmit-beam receive-beam pairs. The second base station may be a base station that the UE is currently connected to (e.g., base station 401, 501, or 801 of FIG. 4, 5, or 8, respectively). Spatial domain multiplexing report component 1140 in FIG. 11 may perform 908.

The report indicating information associated with the subset of the transmit-beam receive-beam pairs may include a number of transmit-beam receive-beam pairs in the subset of transmit-beam receive-beam pairs and/or a set of one or more measured values (e.g., RSRP, RSRQ, SNR, or SINR) associated with each of the transmit-beam receive-beam pairs in the subset of transmit-beam receive-beam pairs. Alternatively, or additionally, the report indicating information associated with the subset of the transmit-beam receive-beam pairs may include an aggregated report including a total number of mutually non-interfering transmit-beam receive-beam pairs, an average (or otherwise summarized or aggregated) value for each of a set of measured values (e.g., any combination of RSRP, RSRQ, SNR, or SINR). The report indicating information associated with the subset of the transmit-beam receive-beam pairs may be received at a base station to be used in making handoff/handover determinations and/or decisions at the base station.

Figure 10:
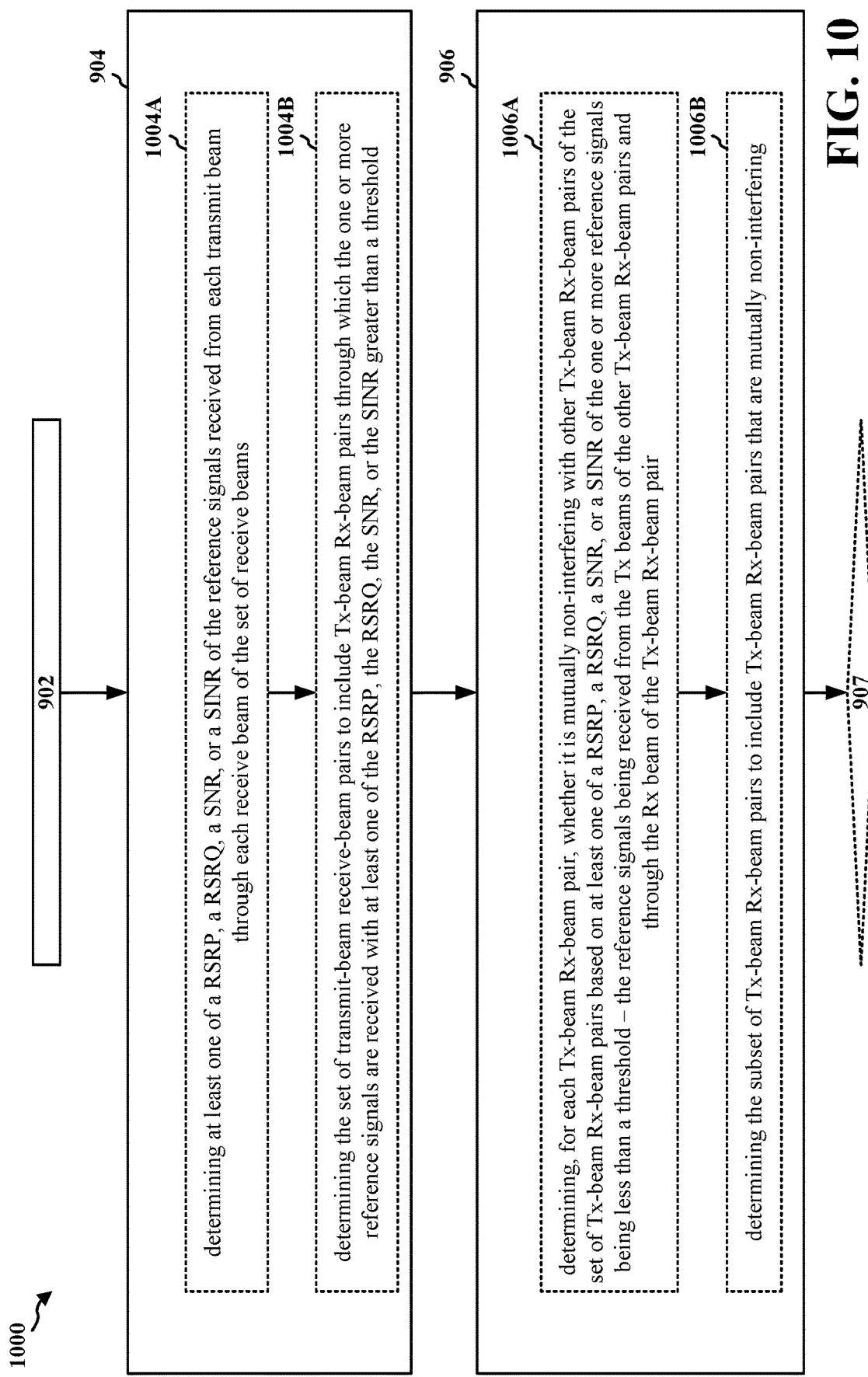
FIG. 10 is a flowchart indicating example sub-operations of operations of the flowchart illustrated in FIG. 9.

FIG. 10 is a flowchart 1000 indicating example sub-operations of operations 904 and 906 of flowchart 900 in FIG. 9. Determining, at 904, a set of transmit-beam receive-beam pairs based on the received reference signals may include, at 1004A, a first determining at least one of a RSRP, a RSRQ, a SNR, or a SINR of the reference signals received from the multiple transmit beams through each receive beam of the set of receive beams. For example, a set of measurements for multiple transit-beam receive-beam pairs may be made as described in connection with the measurement matrix in diagram 610 of FIG. 6A. Spatial domain multiplexing report component 1140 in FIG. 11 may perform 1004A.

Based on the determined at least one of a RSRP, a RSRQ, a SNR, or a SINR of the reference signals received from the multiple transmit beams through each receive beam of the set of receive beams, the method may determine, at 1004B, to include transit-beam receive-beam pairs through which the one or more reference signals are received with at least one of the RSRP, the RSRQ, the SNR, or the SINR greater than a threshold in the set of transmit-beam receive-beam pairs. For example, a first threshold may be applied to the set of measurements for multiple transit-beam receive-beam pairs in the measurement matrix in diagram 610 of FIG. 6A to determine a set of transmit-beam receive-beam pairs (e.g., candidate Tx-beam Rx-beam pairs 631 in FIGS. 6B and 6C) that are measured to have at least one of the RSRP, the RSRQ, the SNR, or the SINR greater than the threshold value. Spatial domain multiplexing report component 1140 in FIG. 11 may perform 1004B.

After determining the set of transmit-beam receive-beam pairs at 904, the method may determine, at 1006A, for each transmit-beam receive-beam pair in the set of transmit-beam receive-beam pairs, whether it is mutually non-interfering with other transmit-beam receive-beam pairs of the set of transmit-beam receive-beam pairs based on at least one of a RSRP, a RSRQ, a SNR, or a SINR of the one or more reference signals received from the transmit beams of the other transmit-beam receive-beam pairs through the receive beam of the transmit-beam receive-beam pair being less than a threshold. The determination for a particular transmit-beam receive-beam pair (e.g., transmit-beam receive-beam pair 621 of FIG. 6B) may be based upon a comparison of the particular measurement (e.g., RSRP, RSRQ, SNR, or SINR) of reference signals from each transmit beam of a base station received at the receive beam of the particular transmit-beam receive-beam pair. For example, if the measurement is a RSRP measured in dBm, a threshold may be based on a fixed difference (e.g., a 10 dBm difference) from the measured RSRP, or may be based on a difference between RSRPs that is dependent on RSRP measured for the particular transmit-beam receive-beam pair (e.g., a lower RSRP may result in a larger threshold difference, while a higher RSRP may result in a smaller threshold difference). Spatial domain multiplexing report component 1140 in FIG. 11 may perform 1006A.

At 1006B, the subset of transmit-beam receive-beam pairs of the set of transmit-beam receive-beam pairs may be determined to include transmit-beam receive-beam pairs that are mutually non-interfering. For example, in diagram 630 of FIG. 6C, interfering and non-interfering transmit-beam receive-beam pairs may be determined for the candidate transmit-beam receive-beam pairs 631 and a subset of mutually non-interfering transmit-beam receive-beam pairs (e.g., selected candidate transmit-beam receive-beam pair set 744 in FIG. 7A) may be determined. The determined subset of mutually non-interfering transmit-beam receive-beam pairs may be one of a set of mutually non-interfering transmit-beam receive-beam pairs (e.g., candidate transmit-beam receive-beam pair set 741 in FIG. 7A) that may be selected based on any of multiple sets of criteria. For example, any of a set of mutually non-interfering transmit-beam receive-beam pairs that have the greatest average measurement (e.g., RSRP, RSRQ, SNR, or SINR), a set of mutually non-interfering transmit-beam receive-beam pairs that includes the largest number of mutually non-interfering transmit-beam receive-beam pairs, or a set of mutually non-interfering transmit-beam receive-beam pairs that do not experience interference from other transmit beams that are not included in the set of mutually non-interfering transmit-beam receive-beam pairs. Spatial domain multiplexing report component 1140 in FIG. 11 may perform 1006B.

Figure 11:
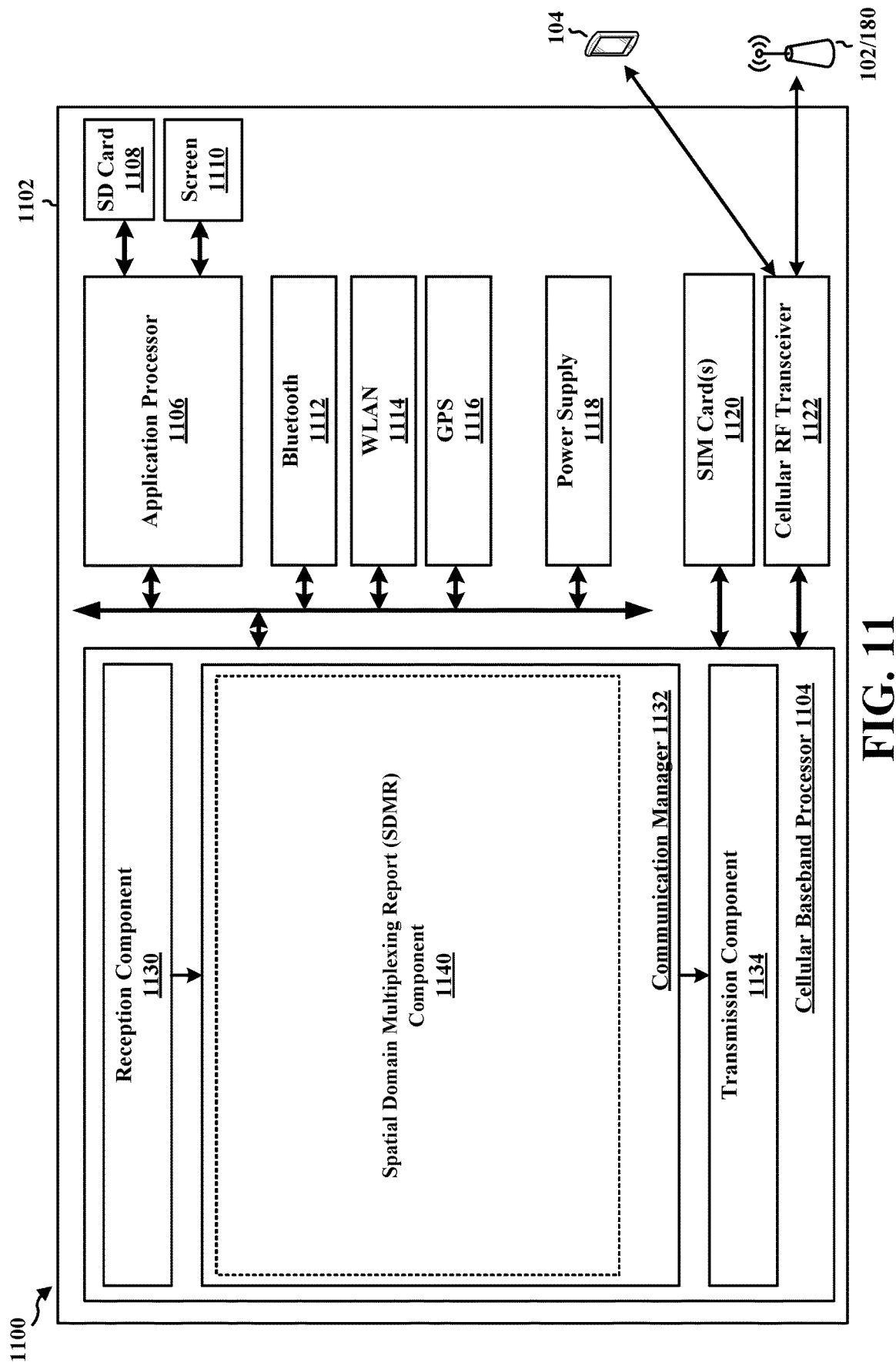
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a spatial domain multiplexing report (SDMR) component 1140 that is configured to report information relating to spatial domain multiplexing, e.g., as described in connection with operations 902-908 and 1004A-1006B of FIGS. 9 and 10. SDMR component 1140 may be configured to receive one or more reference signals from each transmit beam of a set of transmit beams of a first base station through each receive beam of a set of receive beams of the UE, as described in connection with 902 in FIG. 9. SDMR component 1140 may also be configured to determine a set of transmit-beam receive-beam pairs based on the received reference signals, as described in connection with 904 in FIG. 9. SDMR component 1140 may also be configured to determine a subset of the transmit-beam receive-beam pairs of the set of transmit-beam receive-beam pairs that are mutually non-interfering with each other, as described in connection with 906 in FIG. 9. SDMR component 1140 may also be configured to transmit, to a second base station, a report indicating information associated with the subset of the transmit-beam receive-beam pairs, as described in connection with 908 in FIG. 9. The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving one or more reference signals from each transmit beam of a set of transmit beams of a first base station through each receive beam of a set of receive beams of the UE. In one configuration, the apparatus 1102, and in particular the cellular baseband processor 1104, further includes means for determining a set of transmit-beam receive-beam pairs based on the received reference signals. In one configuration, the apparatus 1102, and in particular the cellular baseband processor 1104, further includes means for determining a subset of the transmit-beam receive-beam pairs of the set of transmit-beam receive-beam pairs that are mutually non-interfering with each other. In one configuration, the apparatus 1102, and in particular the cellular baseband processor 1104, further includes means for transmitting, to a second base station, a report indicating information associated with the subset of the transmit-beam receive-beam pairs. The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Referring again to FIGS. 4-10 a method, a computer-readable medium, and an apparatus are provided to generate and transmit a spatial domain multiplexing report for a set of base stations. The spatial domain multiplexing report may allow better handover/handover decisions than a report of signal strengths. The better handoff/handover decisions may be based on receiving the spatial domain multiplexing report with information regarding the available mutually non-interfering transmit-beam receive-beam pairs that can provide multiple possible independent connections instead of receiving a report that provides a reported value that does not account for multiple independent transmit-beam receive-beam pairs. Handing over to a base station with multiple mutually non-interfering (e.g., independent) spatial domain transmit-beam receive-beam pairs may make it less likely to experience a handoff/handover failure when performing a handoff to the base station.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a UE including receiving one or more reference signals from each transmit beam of a set of transmit beams of a first base station through each receive beam of a set of receive beams of the UE, determining a set of transmit-beam receive-beam pairs based on the received reference signals, determining a subset of the transmit-beam receive-beam pairs of the set of transmit-beam receive-beam pairs that are mutually non-interfering with each other, and transmitting, to a second base station, a report indicating information associated with the subset of the transmit-beam receive-beam pairs.

Aspect 2 is the method of aspect 1, where the determining the set of transmit-beam receive-beam pairs includes determining at least one of a RSRP, a RSRQ, a SNR, or a SINR of the one or more reference signals received from each transmit beam of the set of transmit beams through each receive beam of the set of receive beams, and determining the set of transmit-beam receive-beam pairs to include transmit-beam receive-beam pairs through which the one or more reference signals are received with the determined at least one of the RSRP, the RSRQ, the SNR, or the SINR greater than a threshold.

Aspect 3 is the method of any of aspects 1 and 2, where the determining the subset of transmit-beam receive-beam pairs includes determining, for each transmit-beam receive-beam pair of the set of transmit-beam receive-beam pairs, whether the transmit-beam receive-beam pair is mutually non-interfering with other transmit-beam receive-beam pairs of the set of transmit-beam receive-beam pairs based on at least one of a RSRP, a RSRQ, a SNR, or a SINR of the one or more reference signals being less than a threshold, the one or more reference signals being received from the transmit beams of the other transmit-beam receive-beam pairs and through the receive beam of the transmit-beam receive-beam pair, and determining the subset of transmit-beam receive-beam pairs to include transmit-beam receive-beam pairs that are mutually non-interfering with each other.

Aspect 4 is the method of any of aspects 1 to 3, where the threshold is a fixed threshold.

Aspect 5 is the method of any of aspects 1, 3, and 4, where the threshold is a function of at least one of the RSRP, the RSRQ, the SNR, or the SINR of the one or more reference signals received from the transmit beam of the transmit-beam receive-beam pair and through the receive beam of the transmit-beam receive-beam pair.

Aspect 6 is the method of any of aspects 1 and 3-5, where the threshold is a fraction of at least one of the RSRP, the RSRQ, the SNR, or the SINR of the one or more reference signals received from the transmit beam of the transmit-beam receive-beam pair and through the receive beam of the transmit-beam receive-beam pair.

Aspect 7 is the method of any of aspects 1 to 6, where the transmitting the information associated with the subset of the transmit-beam receive-beam pairs includes reporting a set of strength values associated with the transmit-beam receive-beam pairs in the subset of transmit-beam receive-beam pairs.

Aspect 8 is the method of any of aspects 1 to 7, where the transmitted report indicates a number of transmit-beam receive-beam pairs in the subset of transmit-beam receive-beam pairs.

Aspect 9 is the method of any of aspects 1 to 8, where the report is transmitted when a number of transmit-beam receive-beam pairs in the subset of transmit-beam receive-beam pairs is greater than a threshold.

Aspect 10 is the method of any of aspects 1 to 9, where the first base station is a base station neighboring the second base station.

Aspect 11 is the method of any of aspects 1 to 10, further including receiving, based on the transmitted report, a request from the second base station to move in a handoff from the second base station to the first base station.

Aspect 12 is the method of any of aspects 1 to 11, where the transmitted report includes at least one of measurement results for each of the one or more reference signals, measurement results for each cell at the first base station based on the one or more reference signals, or one or more indexes associated with the one or more reference signals.

Aspect 13 is an apparatus for wireless communication including at least one processor coupled to a memory and configured to implement a method as in any of aspects 1 to 12.

Aspect 14 is an apparatus for wireless communication including means for implementing a method as in any of aspects 1 to 12

Aspect 15 is a computer-readable medium storing computer executable code, where the code when executed by a processor causes the processor to implement a method as in any of aspects 1 to 12

What is claimed is:

1. A method of wireless communication of a user equipment (UE) in communication with a second base station, comprising:
   receiving one or more reference signals from each transmit beam of a set of transmit beams of a first base station through each receive beam of a set of receive beams of the UE;
   determining a set of transmit-beam receive-beam pairs based on the one or more reference signals;
   determining a subset of the set of transmit-beam receive-beam pairs of the set of transmit-beam receive-beam pairs to include transmit-beam receive-beam pairs that are mutually non-interfering with each other, wherein a first transmit-beam receive-beam pair in the subset of the transmit-beam receive-beam pairs is mutually non-interfering with a second transmit-beam receive-beam pair of the set of transmit-beam receive-beam pairs based on at least one of a reference signal received power (RSRP), a reference signal received quality (RSRQ), a signal to noise ratio (SNR), or a signal to interference plus noise ratio (SINR) of the one or more reference signals associated with a first transmit beam of the first transmit-beam receive beam pair and received via a second receive beam in the second transmit-beam receive beam pair is less than a first threshold, and at least one of the RSRP, the RSRQ, the SNR or the SINR of the one or more reference signals associated with a second transmit beam of the second transmit-beam receive beam pair and received via a first receive beam in the first transmit-beam receive beam pair is less than the first threshold; and
   transmitting, to the second base station, a report indicating information associated with the subset of the transmit-beam receive-beam pairs.

2. The method of claim 1, wherein the determining the set of transmit-beam receive-beam pairs comprises:
   determining at least one the RSRP, the RSRQ, the SNR, or the SINR of the one or more reference signals received from each transmit beam of the set of transmit beams through each receive beam of the set of receive beams; and
   determining the set of transmit-beam receive-beam pairs to include transmit-beam receive-beam pairs through which the one or more reference signals are received with at least one of the RSRP, the RSRQ, the SNR, or the SINR greater than a second threshold.

3. The method of claim 1, wherein the first threshold is a fixed threshold.

4. The method of claim 1, wherein the first threshold is a function of at least one of the RSRP, the RSRQ, the SNR, or the SINR of the one or more reference signals received from the first transmit beam of the first transmit-beam receive-beam pair and through the first receive beam of the first transmit-beam receive-beam pair.

5. The method of claim 4, wherein the first threshold is a fraction of at least one of the RSRP, the RSRQ, the SNR, or the SINR of the one or more reference signals received from the first transmit beam of the first transmit-beam receive-beam pair and through the first receive beam of the first transmit-beam receive-beam pair.

6. The method of claim 1, wherein the report includes a set of strength values associated with the transmit-beam receive-beam pairs in the subset of the set of transmit-beam receive-beam pairs.

7. The method of claim 1, wherein the report indicates a number of transmit-beam receive-beam pairs in the subset of the set of transmit-beam receive-beam pairs.

8. The method of claim 1, wherein the report is transmitted based on a number of transmit-beam receive-beam pairs in the subset of the set of transmit-beam receive-beam pairs being greater than a threshold.

9. The method of claim 1, wherein the first base station is a base station neighboring the second base station.

10. The method of claim 1 further comprising receiving, based on the report, a request from the second base station to move in a handoff from the second base station to the first base station.

11. The method of claim 1, wherein the report includes at least one of first measurement results for each of the one or more reference signals, second measurement results for each cell at the first base station based on the one or more reference signals, or one or more indexes associated with the one or more reference signals.

12. An apparatus for wireless communication, comprising:
   a memory; and
   at least one processor coupled to the memory and configured to:
   receive one or more reference signals from each transmit beam of a set of transmit beams of a first base station through each receive beam of a set of receive beams of the apparatus;
   determine a set of transmit-beam receive-beam pairs based on the one or more reference signals;
   determine a subset of the set of transmit-beam receive-beam pairs of the set of transmit-beam receive-beam pairs to include transmit-beam receive-beam pairs that are mutually non-interfering with each other, wherein a first transmit-beam receive-beam pair in the subset of the transmit-beam receive-beam pairs is mutually non-interfering with a second transmit-beam receive-beam pair of the set of transmit-beam receive-beam pairs based on at least one of a reference signal received power (RSRP), a reference signal received quality (RSRQ), a signal to noise ratio (SNR), or a signal to interference plus noise ratio (SINR) of the one or more reference signals associated with a first transmit beam of the first transmit-beam receive beam pair and received via a second receive beam in the second transmit-beam receive beam pair is less than a first threshold, and at least one of the RSRP, the RSRQ, the SNR or the SINR of the one or more reference signals associated with a second transmit beam of the second transmit-beam receive beam pair and received via a first receive beam in the first transmit-beam receive beam pair is less than the first threshold; and transmit, to a second base station, a report indicating information associated with the subset of the transmit-beam receive-beam pairs.

13. The apparatus of claim 12, wherein the at least one processor is further configured to:

determine at least one of the RSRP, the RSRQ, the SNR, or the SINR of the one or more reference signals received from each transmit beam of the set of transmit beams through each receive beam of the set of receive beams; and determine the set of transmit-beam receive-beam pairs to include transmit-beam receive-beam pairs through which the one or more reference signals are received with at least one of the RSRP, the RSRQ, the SNR, or the SINR greater than a second threshold.

14. The apparatus of claim 12, wherein the first threshold is a fixed threshold.

15. The apparatus of claim 12, wherein the first threshold is a function of at least one of the RSRP, the RSRQ, the SNR, or the SINR of the one or more reference signals received from the first transmit beam of the first transmit-beam receive-beam pair and through the first receive beam of the first transmit-beam receive-beam pair.

16. The apparatus of claim 15, wherein the first threshold is a fraction of at least one of the RSRP, the RSRQ, the SNR, or the SINR of the one or more reference signals received from the first transmit beam of the first transmit-beam receive-beam pair and through the first receive beam of the first transmit-beam receive-beam pair.

17. The apparatus of claim 12, wherein the report includes a set of strength values associated with the transmit-beam receive-beam pairs in the subset of the set of transmit-beam receive-beam pairs.

18. The apparatus of claim 12, wherein the report indicates a number of transmit-beam receive-beam pairs in the subset of the set of transmit-beam receive-beam pairs.

19. The apparatus of claim 12, wherein the report is transmitted based on a number of transmit-beam receive-beam pairs in the subset of the set of transmit-beam receive-beam pairs being greater than a threshold.

20. The apparatus of claim 12, wherein the first base station is a base station neighboring the second base station.

21. The apparatus of claim 12, wherein the at least one processor is further configured to receive, based on the report, a request from the second base station to move in a handoff from the second base station to the first base station.

22. The apparatus of claim 12, wherein the report includes at least one of first measurement results for each of the one or more reference signals, second measurement results for each cell at the first base station based on the one or more reference signals, or one or more indexes associated with the one or more reference signals.

23. An apparatus for wireless communication, comprising:

means for receiving one or more reference signals from each transmit beam of a set of transmit beams of a first base station through each receive beam of a set of receive beams of the apparatus;

means for determining a set of transmit-beam receive-beam pairs based on the one or more reference signals;

means for determining a subset of the set of transmit-beam receive-beam pairs of the set of transmit-beam receive-beam pairs to include transmit-beam receive-beam pairs that are mutually non-interfering with each other, wherein a first transmit-beam receive-beam pair in the subset of the transmit-beam receive-beam pairs is mutually non-interfering with a second transmit-beam receive-beam pair of the set of transmit-beam receive-beam pairs based on at least one of a reference signal received power (RSRP), a reference signal received quality (RSRQ), a signal to noise ratio (SNR), or a signal to interference plus noise ratio (SINR) of the one or more reference signals associated with a first transmit beam of the first transmit-beam receive beam pair and received via a second receive beam in the second transmit-beam receive beam pair is less than a first threshold, and at least one of the RSRP, the RSRQ, the SNR or the SINR of the one or more reference signals associated with a second transmit beam of the second transmit-beam receive beam pair and received via a first receive beam in the first transmit-beam receive beam pair is less than the first threshold; and means for transmitting, to a second base station, a report indicating information associated with the subset of the transmit-beam receive-beam pairs.

24. The apparatus of claim 23 further comprising:

means for determining at least one of the RSRP, the RSRQ, the SNR, or the SINR of the one or more reference signals received from each transmit beam of the set of transmit beams through each receive beam of the set of receive beams; and means for determining the set of transmit-beam receive-beam pairs to include transmit-beam receive-beam pairs through which the one or more reference signals are received with at least one of the RSRP, the RSRQ, the SNR, or the SINR greater than a second threshold.

25. The apparatus of claim 23, wherein the report indicates a number of transmit-beam receive-beam pairs in the subset of the set of transmit-beam receive-beam pairs.

26. The apparatus of claim 23 further comprising:

means for receiving, based on the report, a request from the second base station to move in a handoff from the second base station to the first base station.

27. A non-transitory computer-readable medium storing computer executable code, the computer executable code when executed by a processor of a device at a user equipment (UE) causes the processor to:

receive one or more reference signals from each transmit beam of a set of transmit beams of a first base station through each receive beam of a set of receive beams of the UE;

determine a set of transmit-beam receive-beam pairs based on the one or more reference signals;

determine a subset of the set of transmit-beam receive-beam pairs of the set of transmit-beam receive-beam pairs to include transmit-beam receive-beam pairs that are mutually non-interfering with each other, wherein a first transmit-beam receive-beam pair in the subset of the transmit-beam receive-beam pairs is mutually non-interfering with a second transmit-beam receive-beam pair of the set of transmit-beam receive-beam pairs based on at least one of a reference signal received power (RSRP), a reference signal received quality (RSRQ), a signal to noise ratio (SNR), or a signal to interference plus noise ratio (SINR) of the one or more reference signals associated with a first transmit beam of the first transmit-beam receive beam pair and received via a second receive beam in the second transmit-beam receive beam pair is less than a first threshold, and at least one of the RSRP, the RSRQ, the SNR or the SINR of the one or more reference signals associated with a second transmit beam of the second transmit-beam receive beam pair and received via a first receive beam in the first transmit-beam receive beam pair is less than the first threshold; and transmit, to a second base station, a report indicating information associated with the subset of the transmit-beam receive-beam pairs.

28. The non-transitory computer-readable medium of claim 27, the computer executable code when executed by the processor of the device at the UE further causes the processor to:

determine at least one of the RSRP, the RSRQ, the SNR, or the SINR of the one or more reference signals received from each transmit beam of the set of transmit beams through each receive beam of the set of receive beams; and determine the set of transmit-beam receive-beam pairs to include transmit-beam receive-beam pairs through which the one or more reference signals are received with at least one of the RSRP, the RSRQ, the SNR, or the SINR greater than a second threshold.

29. The non-transitory computer-readable medium of claim 27, wherein the report indicates a number of transmit-beam receive-beam pairs in the subset of the set of transmit-beam receive-beam pairs.

30. The non-transitory computer-readable medium of claim 27, the computer executable code when executed by the processor of the device at the UE further causes the processor to:

receive, based on the report, a request from the second base station to move in a handoff from the second base station to the first base station.

* * * * *